United States Patent [19]
Fujiwara et al.

[11] Patent Number: 5,027,676
[45] Date of Patent: Jul. 2, 1991

[54] HYDRAULIC CONTROL SYSTEM FOR AUTOMATIC TRANSMISSION

[75] Inventors: Takuji Fujiwara; Hiroshi Yoshimura; Kozo Ishii; Kazuo Takemoto, all of Hiroshima, Japan

[73] Assignee: Mazda Motor Corporation, Hiroshima, Japan

[21] Appl. No.: 403,486

[22] Filed: Sep. 6, 1989

[30] Foreign Application Priority Data

Sep. 8, 1988 [JP] Japan .................. 63-225360
Sep. 14, 1988 [JP] Japan .................. 63-230780

[51] Int. Cl.$^5$ .............................. B60K 41/06
[52] U.S. Cl. ........................ 74/869; 74/867
[58] Field of Search .............. 74/869, 868, 867

[56] References Cited

U.S. PATENT DOCUMENTS

| | | | |
|---|---|---|---|
| 3,823,621 | 7/1974 | Kubo et al. | 74/869 |
| 3,938,409 | 2/1976 | Uozumi | 74/869 |
| 4,560,045 | 12/1985 | Walsh | 74/869 |
| 4,631,982 | 12/1986 | Miki et al. | 74/869 |
| 4,655,774 | 5/1987 | Oguri | 74/868 |
| 4,706,523 | 11/1987 | Nishikawa | 74/867 |

FOREIGN PATENT DOCUMENTS

57-20504  4/1982  Japan .

Primary Examiner—Allan D. Herrmann
Assistant Examiner—Ryan Massey
Attorney, Agent, or Firm—Sixbey, Friedman, Leedom & Ferguson

[57] ABSTRACT

An automatic transmission has a transmission gear mechanism and a plurality of friction coupling members which are applied or released by hydraulic pressures applied thereto under the control of a hydraulic control system. The control system includes a hydraulic control circuit which controls the hydraulic pressure fed to or discharged from the respective friction coupling member, thereby changing the condition of application of the friction coupling members and causing the automatic transmission to shift. The plurality of friction coupling members includes first and second friction coupling members the conditions of application of which are changed during gear shifting from a first predetermined gear speed to a second predetermined gear speed. The first and second friction coupling members are fed with the hydraulic pressure respectively through first and second hydraulic passages. The hydraulic control circuit is provided with a pressure regulator valve which receives the pressure in the first hydraulic passage as a pilot pressure and regulates the hydraulic pressure to be fed to the second friction coupling member through the second hydraulic passage according to the pilot pressure.

14 Claims, 10 Drawing Sheets

HYDRAULIC CONTROL SYSTEM FOR AUTOMATIC TRANSMISSION

BACKGROUND OF THE INVENTION

1. Field of the Invention

This invention relates to a hydraulic control system for an automatic transmission, and more particularly to a hydraulic control system which can properly control the operating timing of friction coupling members upon gear-shifting.

2. Description of the Prior Art

The automatic transmission for a vehicle generally comprises a torque convertor and a transmission gear mechanism, and the transmission is automatically shifted to a desired gear speed by switching the power transmission path in the automatic transmission gear mechanism by a selective actuation of a plurality of friction coupling members such as clutches and brakes. Such an automatic transmission is provided with a hydraulic control circuit which controls feed and discharge of hydraulic pressure to and from the actuators for the friction coupling members. The hydraulic control circuit comprises a regulator valve which regulates the pressure of the hydraulic fluid discharged from an oil pump to a predetermined line pressure, a manual valve for manually switching the driving range, a plurality of shift valves which change the hydraulic passage to the actuators and selectively actuate a plurality of friction coupling members according to the operating condition of the vehicle, and other auxiliary valves. Recently the shift valves are driven by solenoids in order to control the gear-shifting more accurately according to the operating condition of the vehicle.

Such an automatic transmission is sometimes arranged so that the condition of application (applied or released) of a plurality of friction coupling members are simultaneously changed upon a particular gear-shifting. For example, when four-speed automatic transmission has a first friction coupling member which is applied when the transmission is in third or fourth and a second friction coupling member which is applied when the transmission is in second or fourth, the first friction coupling member is applied while at the same time the second friction coupling member is released when the transmission upshifts to third from second. There has been known a hydraulic actuator for actuating the first friction coupling member which is caused to apply the first friction coupling member when an applying hydraulic pressure is supplied thereto and is caused to release the same when a releasing hydraulic pressure is supplied thereto even while the applying hydraulic pressure is being supplied thereto. When such an actuator is used, the first friction coupling member is supplied with the applying hydraulic pressure while the second friction coupling member is supplied with the releasing hydraulic pressure when the transmission is to be shifted from second to third.

A one-way clutch which selectively breaks and connects the power transmission path is sometimes provided in such an automatic transmission in order to smoothly effect the gear-shifting. In this case, the one-way clutch idles and the engine brake effect cannot be obtained when the vehicle coasts. In order to avoid such a problem, a friction coupling member for obtaining the engine brake effect is sometimes provided in parallel to the one-way clutch so that it is applied when the transmission is in a gear speed where the engine brake effect is required. When it is assumed that the friction coupling member for obtaining the engine brake effect is applied when the transmission is in third in the aforesaid automatic transmission which has the first friction coupling member which is applied when the transmission is in third or fourth and the second friction coupling member which is applied when the transmission is in second or fourth, the applying hydraulic pressure is supplied to the first friction coupling member, the releasing hydraulic pressure is supplied to the second friction coupling member and at the same time, the friction coupling member for obtaining the engine brake effect is supplied with the applying hydraulic pressure.

When the conditions of the application of a plurality of friction coupling members are simultaneously changed in order to effect a particular gear-shifting, it is important that the timing of changing the condition of application of each friction coupling member is properly matched with the timing of changing the condition of application of the other friction coupling members. For example, when the first friction coupling member is prematurely applied with respect to the release of the second friction coupling member upon 2-3 upshifting, the transmission will be momentarily neutralized and the engine will race. On the other hand, when the application of the first friction coupling member is too late, the transmission mechanism will momentarily fall into a double locking state and the output torque will be reduced, which leads to a gear-shifting shock.

In order to avoid the problems described above, the hydraulic control circuits are arranged so that the hydraulic pressure is supplied to and discharged from the respective friction coupling members at a proper engine speeds. However, conventionally, the timings of supply and discharge of the hydraulic pressure to and from the respective friction coupling members, the conditions of application of which are to be changed upon a particular gear-shifting, have been separately adjusted by the use of orifices, accummulators or the like. Accordingly, the change of the conditions of application of the friction coupling members are sometimes mistimed and the racing of the engine or the gear-shifting shock can be caused.

In order to overcome the problems described above, there has been proposed, in Japanese Patent Publication No. 57(1982)-20504, a hydraulic control system for an atomatic transmission in which the actual state of the automatic transmission is detected and the hydraulic pressures for the friction coupling members are controlled according to the actual state of the automatic transmission. However, this system is disadvantageous in that the actual state of the transmission is detected through the directions of the torques acting on the members for holding the friction coupling members or a direction of the relative sliding motion of the friction coupling members, and accordingly, the system is complicated in structure.

SUMMARY OF THE INVENTION

In view of the foregoing observations and description, the primary object of the present invention is to provide a hydraulic control system for an automatic transmission in which the conditions of application of a plurality of friction coupling members can be changed at optimal timings with a simple structure, thereby preventing the racing of the engine or the gear-shifting shock due to mistiming of the change of the conditions of application of the friction coupling members.

Another object of the present invention is to provide a hydraulic control system for an automatic transmission which is provided with a friction coupling member which is applied during a particular gear-shifting in order to obtain the engine brake effect, and which cannot fall into the double locking state nevertheless.

In accordance with a first aspect of the present invention, there is provided a hydraulic control system for an automatic transmission which has a transmission gear mechanism and a plurality of friction coupling members which are applied or released by hydraulic pressures applied thereto, the control system comprising a hydraulic control circuit which controls the hydraulic pressure fed to or discharged from the respective friction coupling member, thereby changing the condition of application of the friction coupling members and causing the automatic transmission to shift, characterized in that said plurality of friction coupling members includes first and second friction coupling members the conditions of application of which are changed during gear-shifting from a first predetermined gear speed to a second predetermined gear speed, the first and second friction coupling members are fed with the hydraulic pressure respectively through first and second hydraulic passages, and the hydraulic control circuit is provided with a pressure regulator valve which receives the pressure in the first hydraulic passage as a pilot pressure and regulates the hydraulic pressure to be fed to the second friction coupling member through the second hydraulic passage according to the pilot pressure.

With this arrangement, the first friction coupling member is first fed with the hydraulic pressure and the hydraulic pressure to be fed to the second friction coupling member is controlled by the regulator valve which operates according to the pressure fed to the first friction coupling member. Accordingly, the condition of application of the second friction coupling member is changed in response to change in the condition of application of the first friction coupling member, whereby changing of the condition of application of the second friction coupling member can be well matched with changing of the condition of application of the first friction coupling member. Accordingly, the racing of the engine or the gear-shifting shock can be prevented.

In accordance with the second aspect of the present invention, there is provided a hydraulic control system for an automatic transmission which has a transmission gear mechanism and a plurality of friction coupling members which are applied or released by hydraulic pressures applied thereto, the control system comprising a hydraulic control circuit which controls the hydraulic pressure fed to or discharged from the respective friction coupling member, thereby changing the condition of application of the friction coupling members and causing the automatic transmission to shift, characterized in that said plurality of friction coupling members includes first to third friction coupling members, the first friction coupling member being applied and the second friction coupling member being released during gear-shifting from a first predetermined gear speed to a second predetermined gear speed and the third friction coupling member being applied in order to obtain the engine brake effect during the gear-shifting, the first to third friction coupling members are fed with the hydraulic pressure respectively through first to third hydraulic passages, the second hydraulic passage is provided with a pressure regulator valve which receives the pressure in the first hydraulic passage as a pilot pressure and regulates the hydraulic pressure to be fed to the second friction coupling member through the second hydraulic passage according to the pilot pressure, and the third hydraulic passage branches off from the second hydraulic passage at a portion downstream of the regulator valve.

With this arrangement, the second and third friction coupling members cannot be simultaneously applied since the applying hydraulic pressure cannot be applied to the third friction coupling member until the releasing hydraulic pressure is applied to the second friction coupling member. Thus in accordance with the aspect of the present invention, the transmission cannot fall into the double locking stat.

DESCRIPTION OF THE PREFERRED EMBODIMENT

Figure 1:
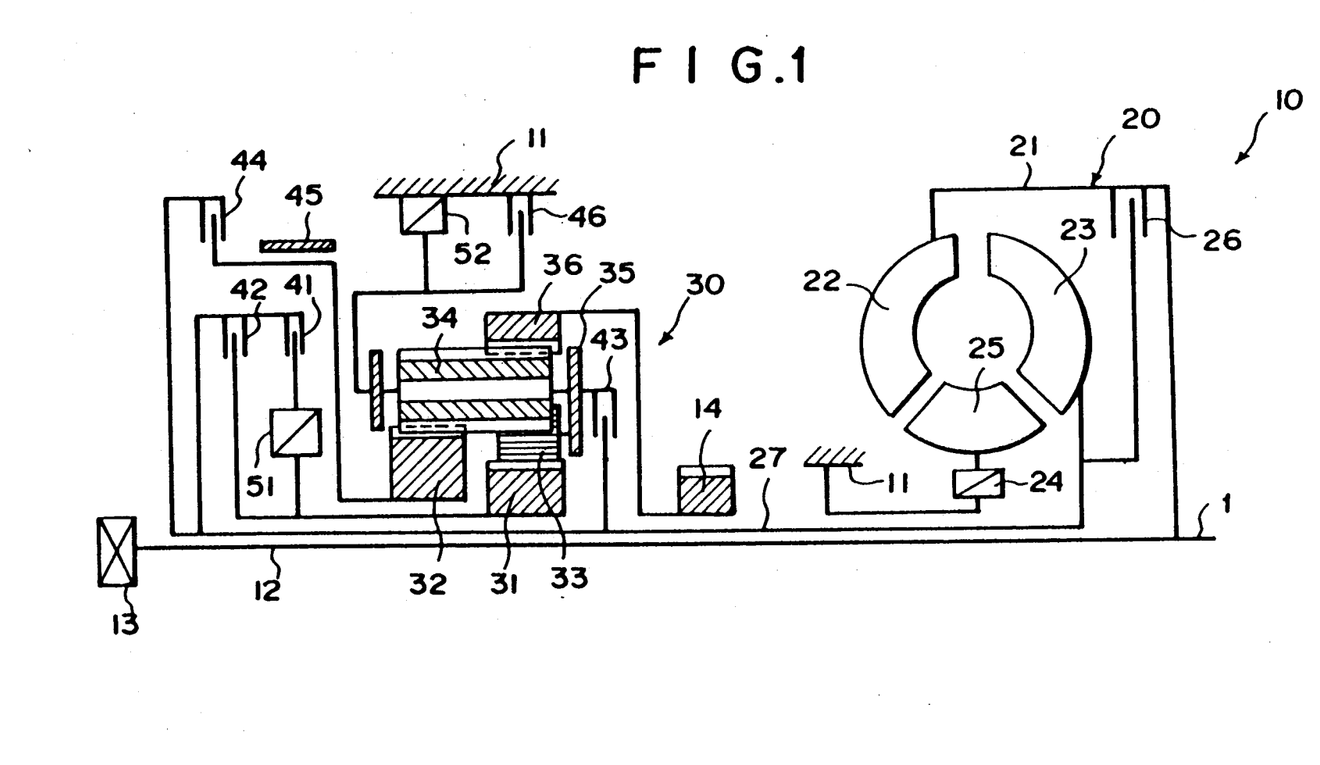
FIG. 1 is a view which schematially shows the mechanical arrangement of an automatic transmission provided with a hydraulic control system in accordance with an embodiment of the present invention.

In FIG. 1, an automatic transmission 10 comprises a torque convertor 20, a transmission gear mechanism 30 which is driven by the output of the torque convertor 20, a plurality of friction coupling members 41 to 46 (clutches or brakes) for determining the power transmission path in the transmission gear mechanism 30, and one-way clutches 51 and 52. The automatic transmission 10 has driving ranges of, D, 2, 1 and R. The transmission 10 can shifts among first to fourth in D range, among first to third in 2 range, and between first and second in 1 range.

The torque convertor 20 comprises a pump 22 which is fixedly mounted in a casing 21 connected to the engine output shaft 1, a turbine 23 which is opposed to the pump 22 and is driven by the pump 22 by way of hydraulic oil, a stator 25 which is disposed between the pump 11 and the turbine 23 and is supported by a transmission casing 11 by way of a one-way clutch 24, and a lockup clutch 26 which directly connects the engine output shaft 1 and the turbine 23 by way of the casing 21. The revolution of the turbine 23 is output to the transmission gear mechanism 30 by way of a turbine shaft 27. A pump shaft 12 extends through the turbine shaft 27 and is connected to the engine output shaft 1. The pump shaft 12 drives an oil pump 13 disposed on the rear side of the transmission 10.

The transmission gear mechanism 30 comprises a small sun gear 31 which is fit on the turbine shaft 27 to be rotatable relative thereto, a large sun gear 32 which is fit on the turbine shaft 27 on the rear side of the small sun gear 31 to be rotatable relative to the shaft 27, a plurality of short pinion gears 33 in mesh with the the small sun gear 31, a long pinion gear 34 which is in mesh with the short pinion gears 33 at the front end portion and with the large sun gear 32 at the rear end portion, a carrier 35 which supports for rotation the long pinion gear 34 and the short pinion gears 33, and a ring gear 36 which is in mesh with the front end portion of the long pinion gear 34.

A forward clutch 41 and and a first one-way clutch 51 are connected in series between the turbine shaft 27 and the small sun gear 31, and a coast clutch 42 is connected between the turbine shaft 27 and the small sun gear 31 in parallel to the clutches 41 and 51. A 3–4 clutch 43 is connected between the turbine shaft 27 and the carrier 35, and a reverse clutch 44 is connected between the turbine shaft 27 and the large sun gear 32. A 2–4 brake 45 which holds stationary the large sun gear 32 is provided between the large sun gear 32 and the reverse clutch 44, and a second one-way clutch 52 which supports the counterforce of the carrier 35 and a low reverse brake 46 are connected in parallel between the carrier 35 and the transmission casing 11. The ring gear 36 is connected to an output gear 14 and the driving force is transmitted to the left and right wheels by way of a differential from the output 14.

When the transmission 10 is in first, the forward clutch 41 is applied and the first and second one-way clutches 51 and 52 are locked. This causes the output of the torque convertor 20 to be transmitted to the small sun gear 31 from the turbine shaft 27 by way of the forward clutch 41 and the first one-way clutch 51. In this case, the carrier 35 is held stationary by the second one-way clutch 52, and accordingly, the transmission gear mechanism 30 acts as a solid gear train in which the rotation is transmitted from the small sun gear 31 to the ring gear 36 by way of the short pinion gears 33 and the long pinion gear 34. At this time, the gear speed corresponds to the ratio of the diameter of the small sun gear 31 to the diameter of the ring gear 36.

When the 2–4 brake 45 is applied to hold stationary the large sun gear 32 and the second one-way clutch 52 is released with the clutches and the brakes in the condition where the transmission 10 is in first, the automatic transmission 10 is shifted to second. In this state, the rotation transmitted to the small sun gear 31 from the turbine shaft 27 is transmitted to the long pinion gear 34 by way of the short pinion gears 33, and the long pinion gear 34 moves around the large sun gear, thereby rotating the carrier 35.

When the 2–4 brake 45 is released and the 3–4 clutch 43 is applied with the clutches and the brakes in the condition where the transmission 10 is in second, the automatic transmission 10 is shifted to third. In this state, the rotation of the turbine shaft 27 is simultaneously transmitted to the small sun gear 31 by way of a forward clutch 41 and a first one-way clutch 51 and to the carrier 35 by way of the 3–4 clutch 43. In this state, the wholetransmission gear mechanism 30 is rotated as a solid body and the ring gear 36 is rotated at the same speed as the turbine shaft 27.

When the automatic transmission 10 is to be shifted to fourth, the 2–4 brake 45 which has been released when the transmission 10 is shifted to third is applied again. In this state, the rotation of the turbine shaft 27 is transmitted to the carrier 35 by way of the 3–4 clutch 43 and the long pinion gear 34 is moved around the large sun gear 32. At this time, the large sun gear 32 is held by the 2–4 brake 45 and accordingly, the long pinion gear 34 is moved around the large sun gear 32 together with the carrier 35 while rotating about its axis. As a result, the ring gear 36 in mesh with the long pinion gear 34 is rotated at a speed equal to the sum of the rotational speed of the carrier 35 (i.e., the rotational speed of the turbine shaft 27) and the speed of the rotation of the long pinion gear 34 about its axis. In this case, though the forward clutch 41 has been applied, the rotation of the turbine shaft 27 cannot be transmitted to the small sun gear 31 since the first one-way clutch 51 has been released.

When the transmission is in R, the reverse clutch 44 and the low and reverse brake 46 are applied. In this state, the rotation of the turbine shaft 27 is transmitted to the large sun gear 32 and the carrier 35 is held stationary. Accordingly, the rotation is transmitted from the large sun gear 32 by way of the gear train which is in a solid state and includes the long pinion gear 34 and the ring gear 36. In this case the reduction gear ratio corresponds to the ratio of the diameter of the large sun gear 32 to the diameter of the ring gear 36. Further, the ring gear 36 is rotated in the direction opposite to the rotation of the turbine shaft 27 or the large sun gear 32.

The first one-way clutch 51 which transmits rotation when the transmission 10 is in first, second or third and the second one-way clutch 52 which supports the counterforce when the transmission 10 is in first idle when the vehicle is coasting. Accordingly, no engine brake effect can be obtained when the transmission 10 is in such gear speeds. However, when the transmission 10 is in third of D range, second or third of 2 range or first or second of 1 range, the coast clutch 42 which is connected in parallel to the first one-way clutch 51 is applied and when the transmission 10 is in first of 1 range, the low and reverse clutch 52 which is connected in parallel to the second one-way clutch 52 is applied, whereby the engine brake effect can be obtained.

The relation between the conditions of application of the clutch and brakes 41 to 46 and the one-way clutches 51 and 52 and the gear speeds is shown in Table 1.

TABLE 1

| RANGE | | CLUTCH | | | | BRAKE | | ONE-WAY CLUTCH | |
|---|---|---|---|---|---|---|---|---|---|
| | | FORWARD (41) | COAST (42) | 3-4 (43) | REVERSE (44) | 2-4 (45) | LOW REVERSE (46) | 1-st (51) | 2-nd (52) |
| P | | | | | | | | | |
| R | | | | | O | | O | | |
| N | | | | | | | | | |
| D | 1 | O | | | | | | O* | O* |
| | 2 | O | | | | O | | O* | |
| | 3 | O | O | O | | | | O* | |
| | 4 | O | | O | | O | | | |
| 2 | 1 | O | | | | | | O* | O* |
| | 2 | O | O | | | O | | O* | |
| | 3 | O | O | O | | | | O* | |

TABLE 1-continued

| RANGE | | CLUTCH | | | BRAKE | | ONE-WAY CLUTCH | |
|---|---|---|---|---|---|---|---|---|
| | FORWARD (41) | COAST (42) | 3-4 (43) | REVERSE (44) | 2-4 (45) | LOW REVERSE (46) | 1-st (51) | 2-nd (52) |
| 1  1 | O | O | | | | O | O* | O* |
| 2 | O | O | | | O | | O* | |

*idle during coasting

Figure 2:
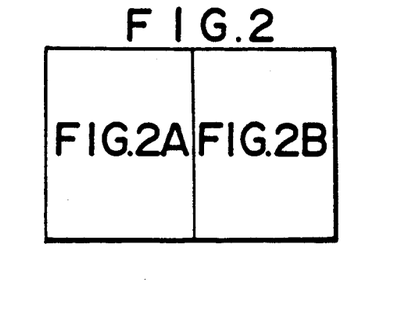
FIG. 2 is a view showing the hydraulic control circuit employed in the hydraulic control system.
Figure 2A:
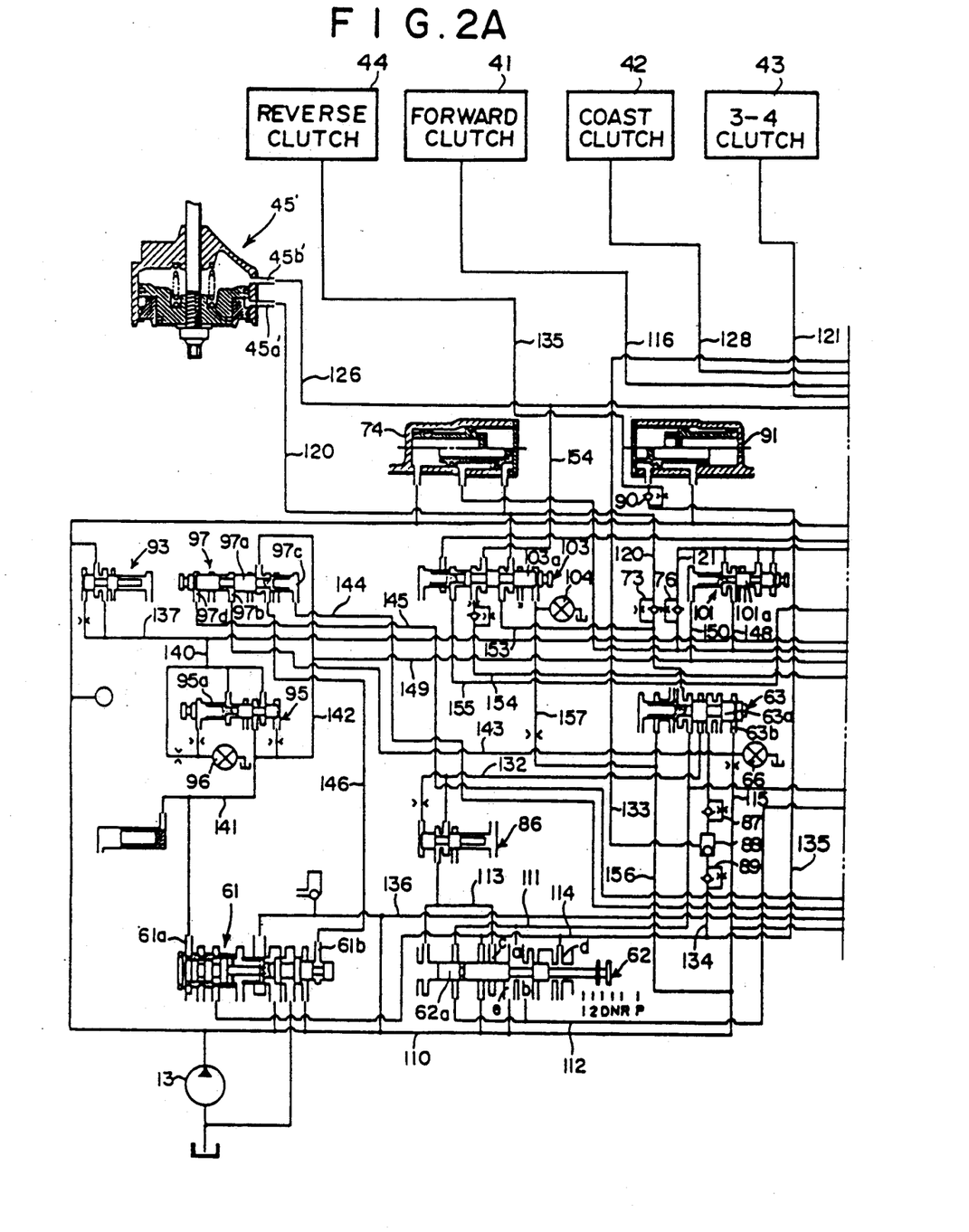
Figure 2B:
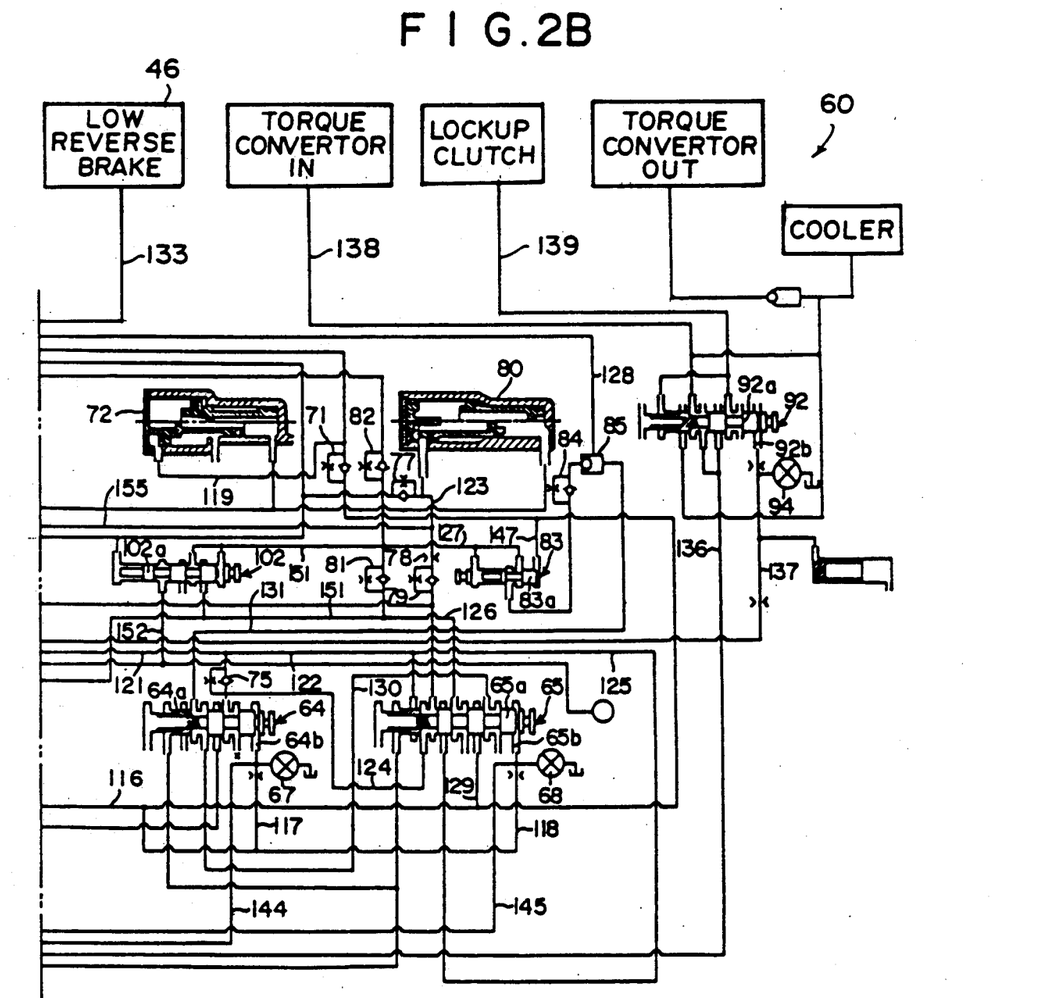

Now the hydraulic control circuit 60 for controlling the hydraulic pressure to the actuators for the friction coupling members 41 to 46 will be described with reference to FIG. 2, hereinbelow.

The actuator 45' for the 2-4 brake 45 comprises a servo piston mechanism having an application port 45a' and a release port 45b'. When the hydraulic pressure is applied to only the application port 45a', the actuator 45' applies the 2-4 brake 45, and when the hydraulic pressure is applied to both the application port 45a' and the release port 45b' and when the hydraulic pressure is applied neither of the ports 45a' and 45b', the actuator 45' releases the same. Each of the actuators for the other friction coupling members 41 to 44 and 46 comprises a hydraulic piston and applies the corresponding friction coupling member when the hydraulic pressure is applied thereto.

The hydraulic control circuit 60 comprises a regulator valve 61 which regulates the pressure of the hydraulic oil discharged to a main line 110 from the oil pump 13 shown in FIG. 1, a manual valve 62 for selecting the driving range, and a 1-2 shift valve 63, a 2-3 shift valve 64 and a 3-4 shift valve 65 which respectively controls feed and discharge of the hydraulic pressure to and from the friction coupling members (or the actuators) 41 to 46.

The manual valve 62 has an input port e through which the line pressure is introduced from the main line 110 and first to fourth output ports a to d. When D range or 2 range is selected, the spool 62a is moved to a position where the input port e is communicated with the first and second output port a and b, when 1 range is selected, the spool 62a is moved to a position where the input port e is communicated with the first and third output ports a and c, and when R range is selected, the spool 62a is moved to a position where the input port e is communicated with the fourth port d. First to fourth output lines 111 to 114 are respectively connected to the first to fourth output ports a to d.

The shift valves 63 to 65 have spools 63a to 65a which arer urged rightward by springs (not shown), and pilot ports 63b to 65b are respectively formed at portions opposed to the right ends of the spools 63a to 65a. To the pilot port 63b of the 1-2 shift valve 63 is connected a first pilotline 115 which is led from the main line 110. To the pilot ports 64b and 65b of the 2-3 shift valve 64 and the 3-4 shift valve 65 are respectively connected second and third pilot lines 117 and 118 which are led from the first output line 111 by way of a line 116. The pilot lines 115, 117 and 118 are respectively provided with first to third solenoid valves 66 to 68. When energized, the solenoid valves 66 to 68 respectively drain the corresponding pilotlines 115, 117 and 118 and remove the pilot pressures acting on pilot ports 63b to 65b, thereby permitting the spools 63a to 65a to slide rightward. While the solenoid valves 66 to 68 are not energized, the pilot pressure acting on the pilot ports 63b to 65b through the pilot lines 115, 117 and 118 hold the spools 63a to 65a in the left positions.

The solenoid valves 66 to 68 are turned on and off by a control signal which is output from a control unit (not shown) on the basis of a map which has been set in advance according to the vehicle speed and the throttle opening. In response to turning on and off the solenoid valves 66 to 68, the spools 63a to 65a of the shift valves 63 to 65 are moved and the hydraulic passages leading to the respective friction coupling members 41 to 46 are changed so that the friction coupling members are applied or released in the pattern shown in table 1. The combination patterns of on and off of the solenoid valves 66 to 68 and the gear speeds obtained are shown in table 2. When the transmission 10 is shifted down from third to second, the combination pattern for second is obtained by way of the intermediate combination pattern shown in table 2.

TABLE 2

| | D | | | | | 2 | | | 1 | |
|---|---|---|---|---|---|---|---|---|---|---|
| | 1 | 2 | INTER-MEDIATE* | 3 | 4 | 1 | 2 | 3 | 1 | 2 |
| 1-st S.V. (66) | OFF | ON | ON | ON | ON | OFF | ON | ON | OFF | ON |
| 2-nd S.V. (67) | ON | ON | ON | OFF | OFF | ON | ON | OFF | ON | ON |
| 3-rd S.V. (68) | ON | ON | OFF | OFF | ON | ON | OFF | OFF | OFF | OFF |

*3-2 downshift

Said line 116 branches off from the first output line 111 which is communicated with the main line 110 when D, 2, or 1 range is selected, and is connected to the forward clutch 41 by way of a one-way orifice 71. Accordingly, in D, 2 and 1 range, the forward clutch 41 is normally applied. An N-D accummulator 72 for damping the shock upon application of the forward clutch 41 is connected to the forward clutch line 116 by way of a line 119.

The first output line 111 is led to the 1-2 shift valve 63 and is brought into communication with a servo application line 120 when the first solenoid valve 66 is turned on and the spool 63a is moved rightward. The servo application line 120 has a one-way orifice 73 and is connected to the application port 45a' of the servo piston 45'. Accordingly, when the selector lever is in D, 2 or 1 and the solenoid valve 66 is on (that is, second, third and fourth of D range, second and third of 2 range, second of 1 range), the servo application pressure is applied to the application port 45a'. When the servo application pressure is applied to the application port 45a', the 2-4 brake 45 is applied so long as the hydraulic pressure (servo release pressure) is not applied to the release port 45b'. An accummulator 74 for damping the shock upon application of the 2-4 brake 45 is connected to the servo application line 120.

The second output line 112 which is communicated with the main line when D or 2 range is selected is led to the 2-3 shift valve 64. The output line 112 is in communication with a 3-4 clutch line 121 by way of a one-way orifice 75 when the second solenoid valve 67 is off and the spool 64a is in the left position. The 3-4 clutch line 121 is led to the 3-4 clutch 43 by way of a one-way orifice 76. Accordingly, when the selector lever is in D or 2 and the solenoid valve 67 is turned on (that is, third and fourth of D range, third of 2 range), the 3-4 clutch 43 is applied.

First and second drain lines 122 and 123 branch off from the 3-4 clutch line 121. The first drain line 122 is led to the 3-4 shift valve 65, and is brought into communication with a line 124 and with the drain port of the 2-3 shift valve 64 when the third solenoid valve 68 is turned off. The second drain line 123 is also led to the 3-4 shift valve 65 by way of a one-way orifice 77, a fixed orifice 78 and another one-way orifice 79, and is brought into communication with the line 124 and with the drain port of the 2-3 shift valve 64 when the third solenoid valve 68 is turned on. That is, during either of the 3-2 downshift and the 4-2 downshift, the 3-4 clutch pressure is discharged, and in the case of the 3-2 downshift during which the third solenoid valve 68 is off in the intermediate pattern as shown in table 2, the 3-4 clutch pressure is discharged through the first drain line 122 while in the case of the 4-2 downshift during which which the third solenoid valve 68 is kept on, the 3-4 clutch pressure is discharged through the second drain line 123. A 2-3 accummulator 80 for damping the shock upon operation of the 3-4 clutch 43 is connected to the second drain line 123 between the one-way orifice 77 and the fixed orifice 78.

A line 125 is connected to the first drain line 122 and is brought into communication with the second output line 112 when the second solenoid valve 67 is turned off and the spool 64a of the 2-3 shift valve 64 is moved left. The line 125 is led to the 3-4 shift valve 65 and is brought into communication with a servo release line 126 when the third solenoid valve 68 is turned off and the spoll 65a is moved left. The line 126 is led to the release port 45b' of the servo piston 45' by way of one-way orifices 81 and 82. Accordingly, when the solenoid valves 67 and 68 are both turned off while the selector lever is in D or 2 (that is, third of D range, third of 2 range), the servo release pressure is applied to the release port 45b' of the servo piston 45' and the 2-4 brake is released.

A line 127 branches off from the servo release line 126 at a portion between the one-way orifices 81 and 82 and is led to a coast clutch line 128 and to the coast clutch 42 by way of a coast control valve 83, a one-way orifice 84 and a ball valve 85. Accordingly, the coast clutch 42 is applied when the hydraulic pressure is introduced into the servo release line 126, that is, when the transmission 10 is to be in third of D range or in third of 2 range. On the other hand, when the third solenoid valve 68 is off, that is, the spool 65a of the 3-4 shift valve 65 is in the left position, and at the same time the second solenoid valve 67 is on, that is, the spool 64a of the 2-3 shift valve 64 is in the right positon, the forward clutch line 116 is communicated with a line 131 by way of a branch line 129, the 3-4 shift valve 65, a line 130 and a 2-2 shift valve 64. The line 131 is led to the coast clutch line 128 by way of the ball valve 85, and accordingly, the coast clutch 42 is also applied when the second solenoid valve 67 is on and the third solenoid valve 68 is off, that is, when the transmission 10 is to be in second of 2 range or in first or second of 1 range.

The third output line 113 which is communicated with the main line 110 when 1 range is selected is led to the 1-2 shift valve 63 by way of a low reducing valve 86 and a line 132. The line 132 is communicated with a low and reverse line 133 and the low and reverse brake 46 by way of a one-way orifice 87 and a ball valve 88 when the first solenoid valve 66 is off and the spool 63a in the in left position. Accordingly, when 1 range has been selected and the first solenoid valve 66 is turned off, that is, when the transmission 10 is to be in first of 1 range, the low and reverse brake 46 is applied.

The fourth output line 114 which is communicated with the main line 110 when R range is selected is further communicated with the low and reverse brake line 133 by way of a line which branches off from the line 114, a one-way orifice 89 and the ball valve 88. Further, the fourth output line 114 merges into a reverse clutch line 135 which is communicated with the reverse clutch 44 by way of a one-way orifice 90. Accordingly, when R range is selected the low and reverse brake 46 and the reverse clutch 44 are kept applied. An N-R accummulator 91 for damping the shock upon application of the reverse clutch 44 is connected to the reverse clutch line 135.

The hydraulic control circuit 60 is further provided with a lockup valve 92 for actuating the lockup clutch 26 in the torque convertor 20. The lockup valve 92 is communicated with the regulator valve 61 by way of a torque convertor line 136, and a pilot line 137 is connected to a pilot port 92b of the lockup valve 92. The pilot line 137 branches off from the main line 110, and a hydraulic pressure reduced by solenoid reducing valve 93 is introduced into the pilot line 137. Further, the pilot line 137 is provided with a fourth solenoid valve 94 for lockup. When the fourth solenoid valve 94 is on and the spool 92a is in the right position, the torque convertor line 136 is communicated with a torque convertor in-line 138. This increases the inner pressure of the torque convertor 20 and applies the lockup clutch 26. On the other hand, when the fourth solenoid valve 94 is turned off and the spool 92a is moved leftward, the torque convertor 20 is communicated with a lockup release line 139 and a lockup release pressure is introduced into the torque convertor 20, whereby the lockup clutch 26 is released.

Further, the hydraulic control circuit 60 is provided with a throttle modulator valve 95 for controlling the line pressure regulated by the regulator valve 61, a duty solenoid valve 96 for actuating the modulator valve 95, and cutback valve 97.

The throttle modulator valve 95 is connected to a line 140 which branches off from the line 137 which is communicated with the main line 110 by way of the solenoid reducing valve 93. A pilot pressure which has been regulated by the duty solenoid valve 96 which periodically opens and closes is applied to one end of the spool 95a of the valve 95, and the throttel modulator valve 95 generates a throttle modulator pressure according to the duty ratio (the ratio of the valve opening time in one period) of the duty solenoid valve 96. The duty ratio is set according to the opening of the throttle valve of the engine, and the throttle modulator pressure corresponding to the duty ratio is applied to a booster port 61a of the regulator valve 61 by way of a line 141, whereby the regulated line pressure is boosted with increase in the throttle opening.

The cutback valve 97 is connected to a line 142 which branches off from the line 141. The cutback valve 97 is provided with a spool 97a and first to third ports 97b to 97d. A pilot pressure which is generated when the first solenoid valve 66 is off is applied to the first port 97b by way of a line 143, a pilot pressure which is generated when the second solenoid valve 67 is off is applied to the second port 97c by way of a line 144, and a pilot pressure which is generated when the third solenoid valve 68 is off is applied to the second port 97d by way of a line 145. The spool 97a moves according to the pilot pressure applied thereto. That is, the line 142 is closed when the transmission 10 is in first of D range or 2 range, that is, when the pilot pressure is applied only to first port 97b (i.e., only the first solenoid valve 66 is off), when the transmission 10 is in first of 1 range, that is, when the pilot pressure is applied to the first and third ports 97b and 97d (i.e., the first and third solenoid valves 66 and 68 are off), and when the transmission 10 is in second of 2 range or 1 range, that is, when the pilot pressure is applied to only the third port 97d (only the third solenoid valve 68 is off). When the transmission 10 is in other gear speeds, the line 142 is communicated with a line 146 and the throttle modulator pressure is applied to a pressure reduction port 61b of the regulator valve 61, whereby the line pressure is reduced.

The hydraulic control circuit 60 is further provided with a bypass valve 101, a 2-3 control valve 102 and a timing valve 103 in addition to the coast control valve 83 in order to adjust the timing of feed and discharge of hydraulic pressure during each gear-shifting.

As described above, the coast control valve 83 is provided in the line 127 which branches off from the servo release line 126 and is communicated with the coast clutch line 128 by way of the ball valve 85. The line pressure (forward clutch pressure) is applied to one end of the spool 83a of the coast control valve 83 by way of a line 147 which branches off from the forward clutch line 116. When the servo release pressure applied to the other end of the spool 83a by way of the line 127 and the force of the spring urging the spool 83a overcome the line pressure, the coast control valve 83 opens the line 127. Accordingly, when the transmission 10 upshifts from second to third with the selector lever in D range or 2 range, when the coast clutch pressure is applied to the coast clutch 42 by way of the line 127, the coast clutch 42 cannot be applied until the servo release pressure sufficiently rises, that is, until the 2-4 brake is completely released. Thus the 2-4 brake 45 and the coast clutch 42 are prevented from being simultaneously applied. That is, the double locking is prevented. Since the line pressure is applied to the end of the spool 83a, the timing of opening the line 127 is changed according to the line pressure, whereby the timing of opening the line 127 is properly set with respect to the pressure level of the servo release pressure.

Said bypass valve 101 is provided in a bypass line 148 which bypasses the one-way orifice provided in the 3-4 clutch line 121. The hydraulic pressure in the 3-4 clutch line 121 downstream of the one-way orifice 76 (3-4 clutch pressure) is applied to one end of the spool 101a of the bypass value 101, and the throttle modulator pressure is applied to the other end of the spool 101a by way of the lines 149 and 150 which are led from the throttle modulator valve 95 so that the bypass line 148 is closed when the 3-4 clutch pressure rises above a predetermined value and the spool 101a is moved leftward. Accordingly, the 3-4 clutch pressure is quickly fed through the bypass line 148 at the beginning but, thereafter, is gently fed by virtue of the one-way orifice 76. The timing of application of the 3-4 clutch 43 during the 2-3 upshift is thus adjusted and is changed according to the throttle opening.

Said 2-3 control valve 102 is provided in a bypass line 151 which bypasses the one-way orifice 81 provided in the servo release line 126 to throttle the hydraulic pressure in the feeding direction. The hydraulic pressure in the 3-4 clutch line 121 (3-4 clutch pressure) is applied to one end of the spool 102a of the bypass valve 102, the throttle modulator pressure is applied to the intermediate portion of the spool 102a by way of the lines 149 and 152, and the servo release pressure downstream of the bypass line 151 is applied to the other end of the spool 102a. The bypass line 151 is opened or drained by the effect of the 3-4 clutch pressure, the throttle modulator pressure and the servo release pressure, whereby the servo release pressure is regulated according to the 3-4 clutch pressure.

The timing valve 103 is provided across a first bypass line 153 which bypasses the one-way orifice 73 in the servo application line 120, a second bypass line 154 which bypasses the one-way orifices 81 and 82 in the servo release line 126, and a third bypass line 155 which bypasses the fixed orifice 78 and the one-way orifice 79 in the second drain line 123. A pilot line 157 which is led from the main line 110 by way of a line 156 is connected to the spool 103a of the timing valve 103, and a fifth solenoid valve 104 is provided in the pilot line 157.

The timing valve 103 is actuated by the fifth solenoid valve 104, and selectively closes and opens the first to third bypass lines 153 to 155 upon the 1-2 upshift, the 3-2 downshift and the 4-2 downshift, thereby controlling the timing of feed and discharge of the hydraulic pressure during these gear-shiftings as will be described in more detail later.

The behavior of the 2-3 control valve 102 and the coast control valve 83 during the 2-3 upshift will be described in more detail with reference to FIG. 3, hereinbelow.

During the 2-3 upshift, the 3-4 clutch pressure is fed to the 3-4 clutch line 121 by the operation of the 2-3 shift valve 64 and is applied to the 3-4 clutch 43, whereby the 3-4 clutch 43 is applied. At this time, as described above, the 3-4 clutch pressure is quickly fed through the bypass line 148 at the beginning, and is gently fed by virtue of the one-way orifice 76 after the bypass valve 101 closes the bypass line 148 when the 34 clutch pressure increases to a predetermined pressure. As a result, during the 2-3 upshift, the 3-4 clutch pressure rises in the manner shown by the solid line in FIG. 4. The 3-4 clutch pressure is applied to a pilot port 102b on one end of the 2-3 control valve 102 by way of a pilot line 121a which branches off from the 3-4 clutch line 121.

The 2-3 control valve 102 is provided with first and second ports 102c and 102d, a drain port 102e and a feedback port 102f. The upstream side 151a of the bypass line 151 which bypasses the one-way orifice 81 in the servo release line 126 is connected to the first port 102c, and the downstream side 151b of the bypass line 151 is connected to the second port 102d. The drain port 102e is adjacent to the second port 102d. The feedback port 102f is formed on the end of the 2-3 control valve 102 opposite to the pilot port 102b, and the servo release pressure in the downstream side 151b of the bypass line 151 is applied to the feedback port 102f. Further, the 2-3 control valve 102 is provided with a throttle modulator port 102g to which the throttle modulator pressure is applied from the throttle modulator valve 95 by way of the lines 149 and 152. The spool 102a is urged toward the feedback port 102f by a spring 102h.

Figures 3, 4:
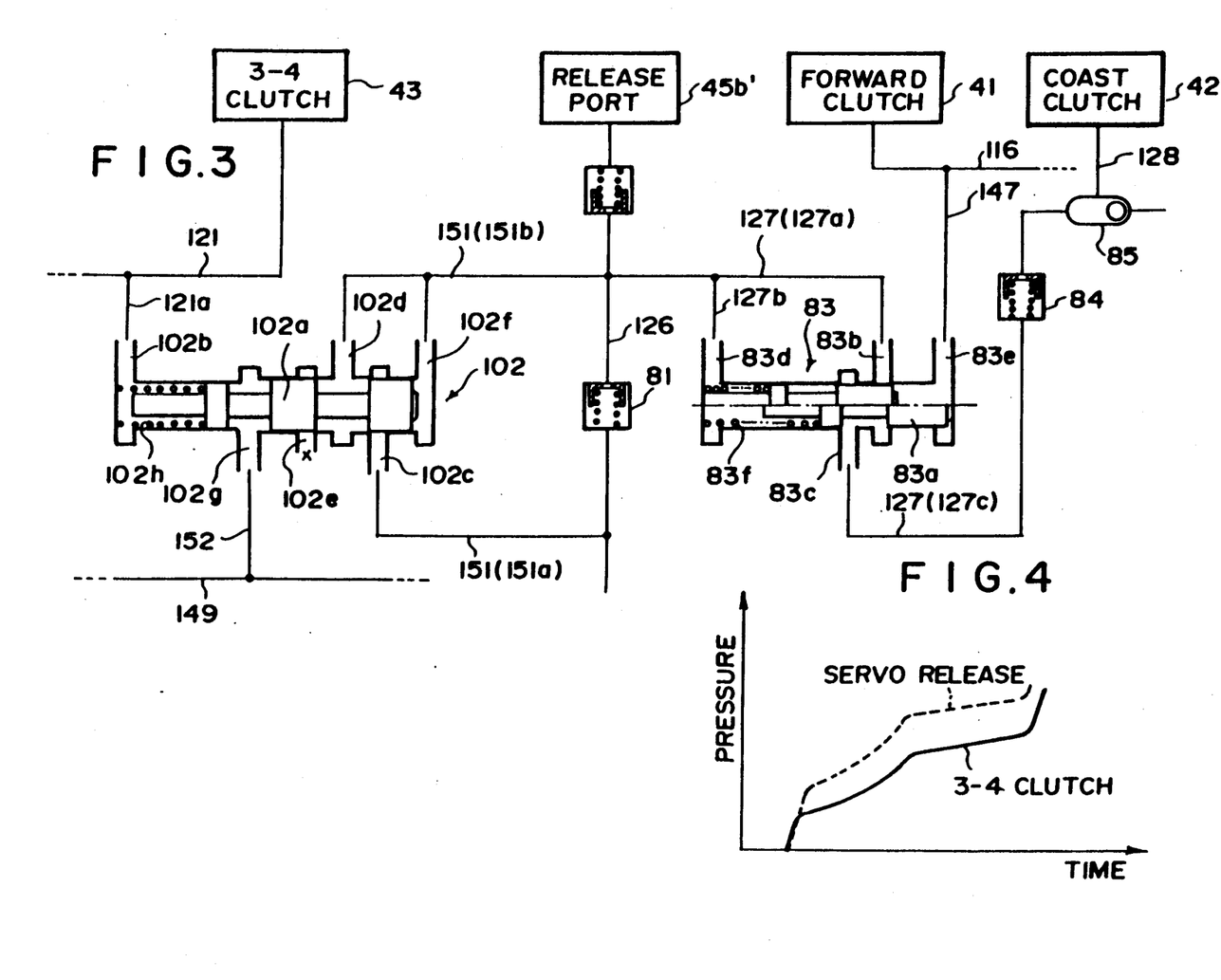
FIG. 3 is an enlarged view of a part of the hydraulic control circuit shown in FIG. 2.
FIG. 4 shows the manner of rising of 3-4 clutch pressure and the servo release pressure.

When the 3-4 clutch pressure is applied to the pilot port 102b risen, the spool 102a is moved rightward as seen in FIG. 3, and the upstream side 151a and the downstream side 151b of the bypass line 151 are communicated while the drain port 102e is closed, whereby the hydraulic pressure in the downstream side 151b of the bypass line 151, i.e., the servo release pressure rises. When the servo release pressure becomes higher than the 3-4 clutch pressure in the pilot port 102b, the spool 102a is moved leftward overcoming the 3-4 clutch pressure and the force of the spring 102h since the servo release pressure is applied to the feedback port 102f, whereby the communication between the first and second ports 102c and 102d or between the upstream side 151 and the downstream side 151b of the bypass line 151 is broken and the downstream side 151b is brought into communication with the drain port 102e. Accordingly, the servo release pressure in the downstream side 151b is reduced. While these actions are repeated, the servo release pressure is regulated to the pressure corresponding to the 3-4 clutch pressure (as the pilot pressure).

Accordingly, the 3-4 clutch pressure and the servo release pressure can be respectively applied to the 3-4 clutch 43 and the release port 45b' of the servo piston 45' during the 2-3 upshift with a fixed relation with respect to each other, whereby the relation between the timing of the application of the 3-4 clutch 43 and the timing of the release of the 2-4 brake 45 can be kept optimal. Thus, the racing of the engine or the gear-shifting shock can be avoided. The servo release pressure changes according to the throttle modulator pressure and increases with increase in the throttle opening while maintaining the optimal relation to the 3-4 clutch pressure.

The servo release pressure which is regulated according to the 3-4 clutch pressure in the manner described above is applied to a first port 83b of the coast control valve 83 by way of the line 127 (the upstream side 127a) and to a pilot port 83d formed on one end of the coast control valve 83 by way of a pilot line 127b which branches off from the line 127. The coast control valve 83 is further provided with a second port 83c adjacent to the first port 83b, and the second port 83c is connected to the downstream side 127c of the line 127. A line pressure port 83e formed on the other end of the coast control valve 83, and the line pressure is applied to the line pressure port 83e by way of a line 147 which branches off from the forward clutch line 116.

When the servo release pressure applied to the pilot port 83d and the force of the spring 83f overcome the line pressure applied to the line pressure port, the spool of the coast control valve 83 moves rightward and the first and second ports 83b and 83c are communicated, that is, the upstream side 127a and the downstream side 127c of the line 127 are communicated with each other as described above. Thus the servo release pressure is applied to the coast clutch 42 as the coast clutch pressure by way of the line 127, the one-way orifice 84, the ball valve 85 and the line 128. That is, the coast clutch 42 is applied under the servo release pressure.

The 2-3 control valve 102 which regulates the servo release pressure according to the 3-4 clutch pressure effects such regulation through fine movements of the spool 102a. Such a valve is apt to stick, and in the case the 2-3 control valve 102 sticks, the release port 45b' of the servo piston 45' cannot be applied with the servo release pressure during the 2-3 upshift. If the coast clutch pressure is applied to the coast clutch 42 by way of a separate line in this situation, the 3-4 clutch 43 and the coast clutch 42 will be applied with the 2-4 brake 45 kept applied, and the transmission mechanism will fall into a double locking state.

On the other hand, in this hydraulic control circuit 60, the coast clutch 42 cannot be applied if the spool 102a sticks and the servo release pressure does not rise to disable the 2-4 brake 45 from being released since the coast clutch 42 is applied under the servo release pressure. Thus the transmission mechanism is prevented from falling into the double locking state.

In this case, though the 2-4 brake 45 and the 3-4 clutch 43 are applied, and the transmission 10 is momentarily shifted to fourth, the hydraulic pressure is gradually applied to the release port 45b' of the servo piston 45' by way of the one-way orifice 81 in the line 126 and accordingly to the coast clutch 42. Accordingly, the transmission 10 can be shifted to third in a predetermined time.

The behavior of the timing valve 103 during the gear-shiftings described above will be described in more detail with reference to FIGS. 5 to 9, hereinbelow.

Figure 5:
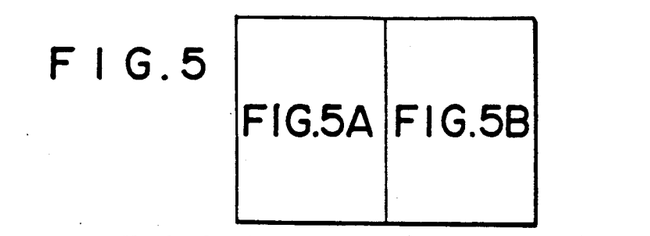
FIG. 5 is an enlarged view of another part of the hydraulic control circuit shown in FIG. 2, FIGS. 6 to 8 are view showing the change in the hydraulic pressure and the operation of the solenoid valves.
Figure 5A:
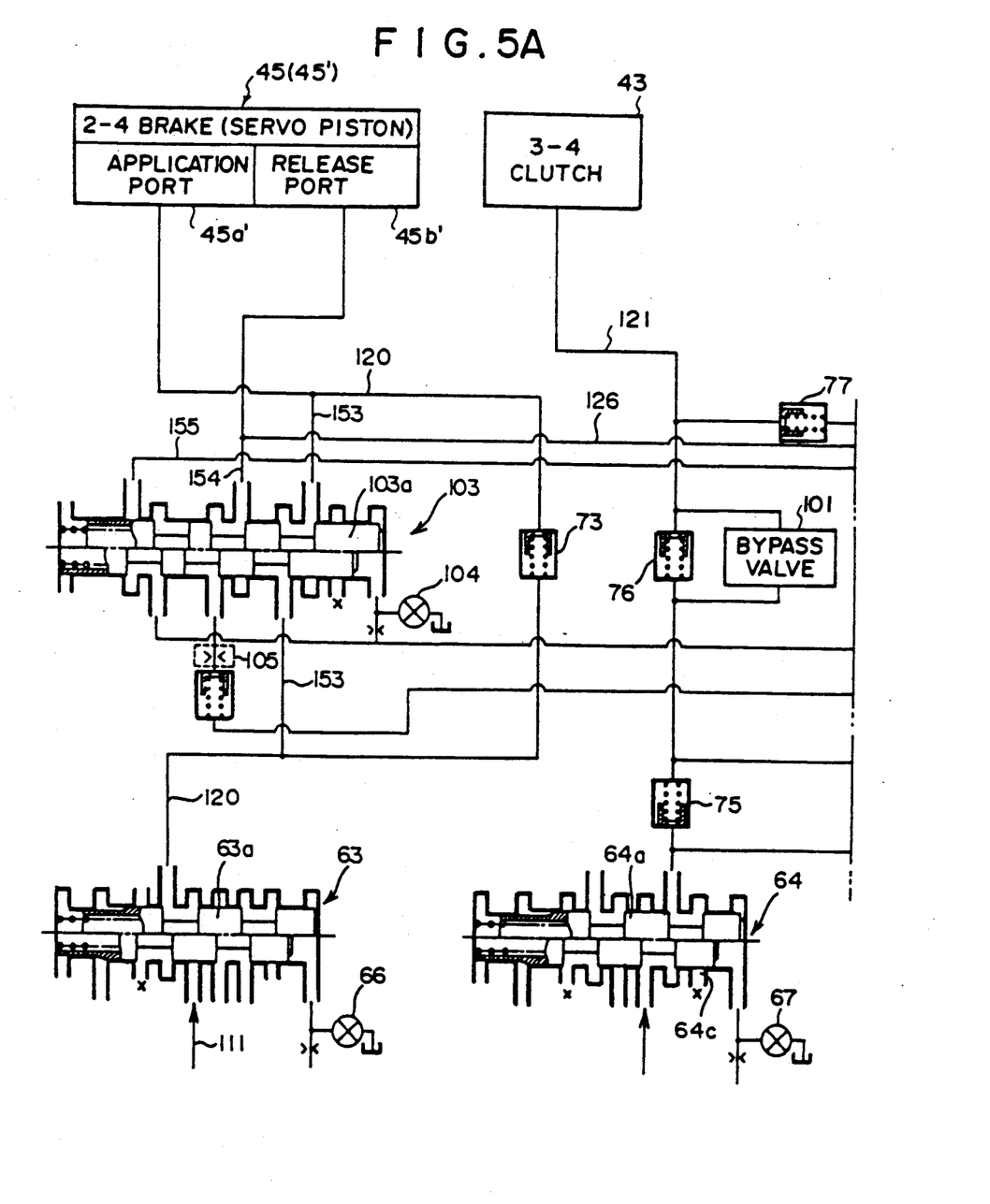
Figure 5B:
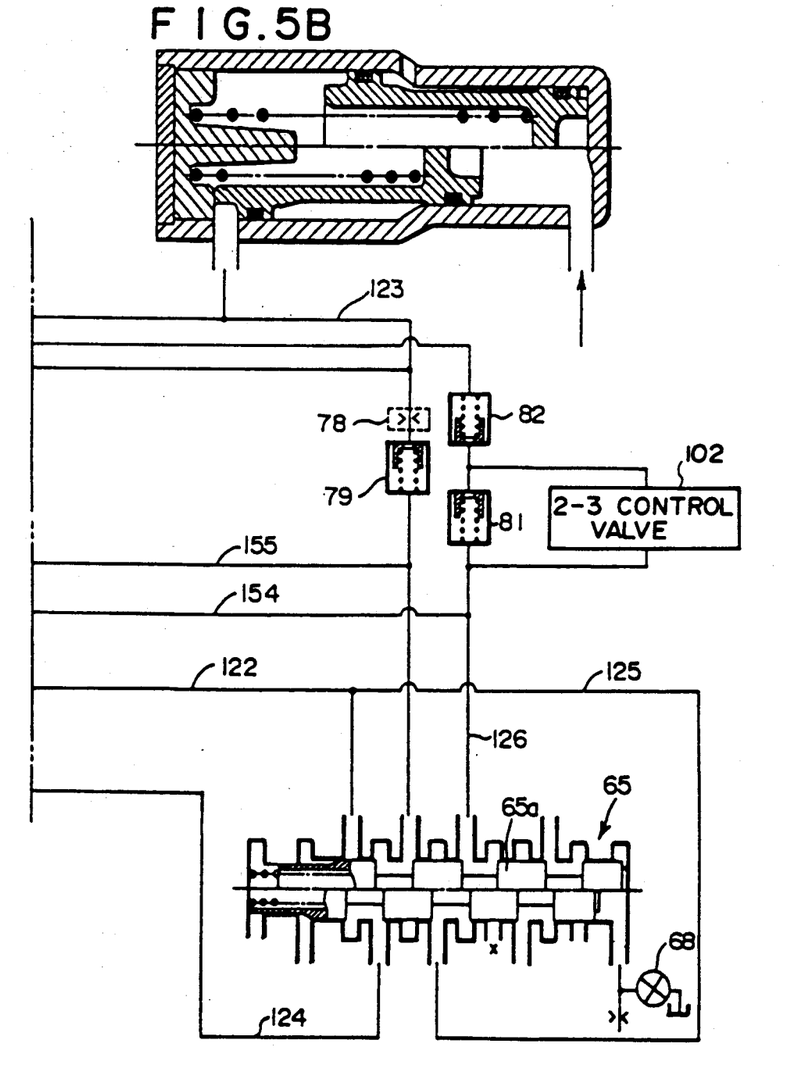
Figure 6:
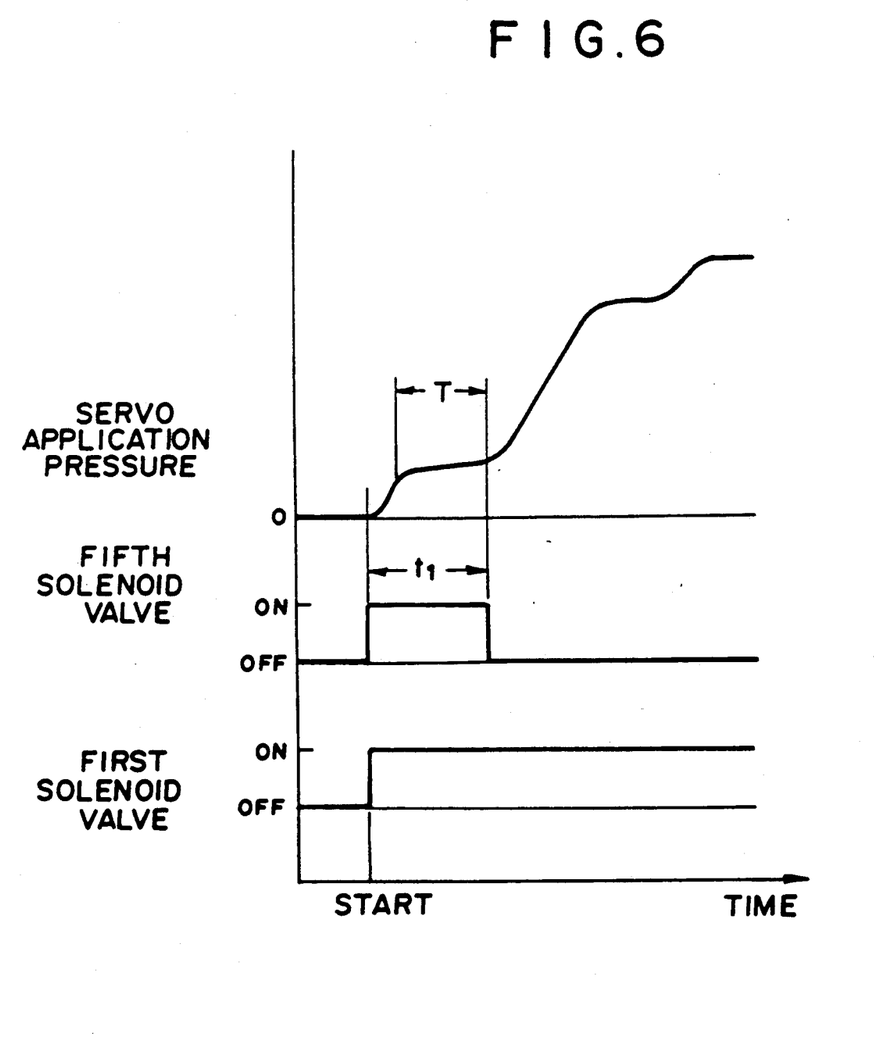

When the first solenoid valve 66 is turned on and the spool 63a of the 1-2 shift valve 63 is moved rightward during the 1-2 upshift, the first output line 111 is communicated with the servo application line 120 and the servo application pressure is applied to the application port 45a' of the servo pistion 45' by way of the one-way orifice 73, whereby the 2-4 brake 45 is applied. While these actions are progressing, the fifth solenoid valve 104 which actuates the timing valve 103 is turned on at the start of the gear-shifting as shown in FIG. 6. When the fifth solenoid valve 104 is turned on, the spool 103a of the timing valve 103 is moved rightward and the first bypass line 153 which bypasses the one-way orifice 73 is opened. Accordingly, the servo application pressure is quickly fed to the servo application port 45a' in the former half of the gear-shifting. The fifth solenoid valve 104 is turned off again a predetermined time t1 after the start of the gear-shifting and the spool 103a of the timing valve 103 is moved leftward to close the first bypass line 153. Accordingly, in the latter half of the gear-shifting, the servo application pressure is fed to the application port 45a' by way of the one-way orifice 73. The servo application pressure changes during the 1-2 upshift as shown in FIG. 6. The piston moving time T in the former half of the gear-shifting is shortened and the time lag in the upshift operation is reduced. Further, by virtue of the 1-2 accummulator 74 described above in conjunction with FIG. 2 and the one-way orifice 73, the upshift can be smoothly performed.

When the transmission 10 is to downshift from third to second with the selector lever in D range, the second and third solenoid valves 67 and 68 are both off before the start of the gear-shifting and are both on after the completion of the gear-shifting. During the gear-shifting, the second solenoid valve 67 is kept on and the third solenoid valve 68 is kept off. Accordingly, the spool 64a of the 2-3 shift valve 64 is in the right position and the spool 65a of the 3-4 shift valve is in the left position during the gear-shifting. Accordingly, the servo release pressure which has been applied to the release port 45b' of the servo piston 45' is released from the drain port 64c of the 2-3 shift valve 64 by way of the line 126, the one-way orifices 82 and 81, the 3-4 shift valve 65, the line 125 and the one-way orifice 75. During the gear-shifting, the fifth solenoid valve 104 is turned on upon starting of the gear-shifting and is turned on again after a predetermined time t2. Accordingly, the spool 103a of the timing valve 103 is first moved rightward to open the second bypass line 154, and then moved leftward to close the same. Thus, the servo release pressure is first quickly discharged through the second bypass line 154 and then gently discharged by way of the one-way orifice 82 which throttles the hydraulic pressure in the discharging direction. Though the fixed orifice 105 is provided in the second bypass line 154, the orifice 105 is sufficiently larger than the orifice 82 in diameter.

Figure 7:
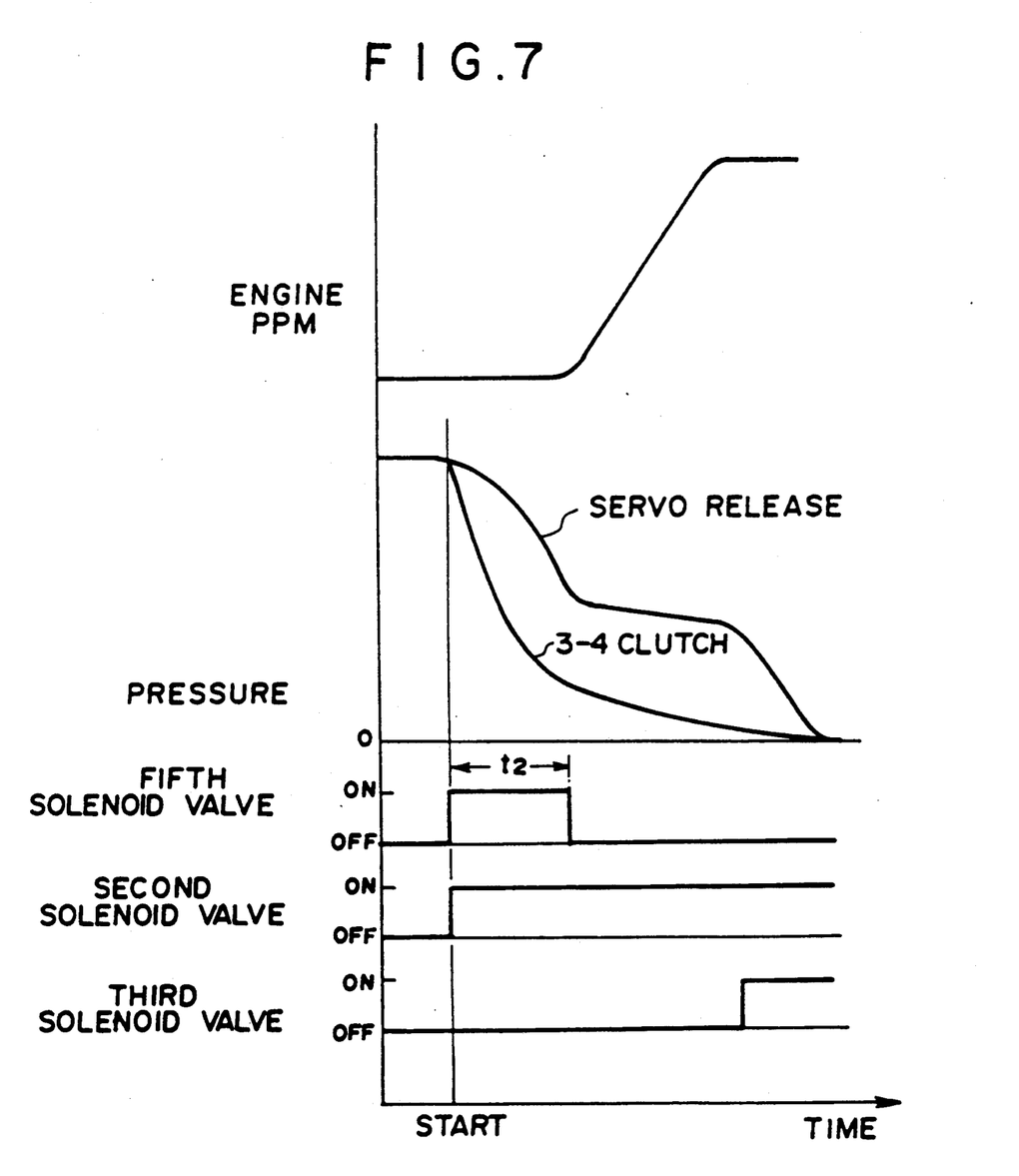

During the 3-2 downshift, the 3-4 clutch pressure is discharged from the 3-4 clutch 43. At this time, since the third solenoid valve 68 is off and the spool 65a of the 3-4 shift valve 65 is in the left position, the 3-4 clutch pressure is discharged from the drain port 64c of the 2-3 shift valve 64 by way of the line 121, the one-way orifice 76 (which does not exhibit the throttling effect), the second drain line 122, the 3-4 shift valve 65 and the line 124. Accordingly, the 3-4 clutch 43 is quickly released and the engine speed can be quickly increased during the 3-2 downshift as shown in FIG. 7. At the same time, when the time t2 for which the bypass line 154 is opened and which governs the discharge of the servo release pressure and the diameter of the one-way orifice 82 is properly set, the completion of the application of the 2-4 brake 45 can be well timed with termination of increase in the engine speed, thereby realizing a quick and smooth gear-shifting.

Figure 8:
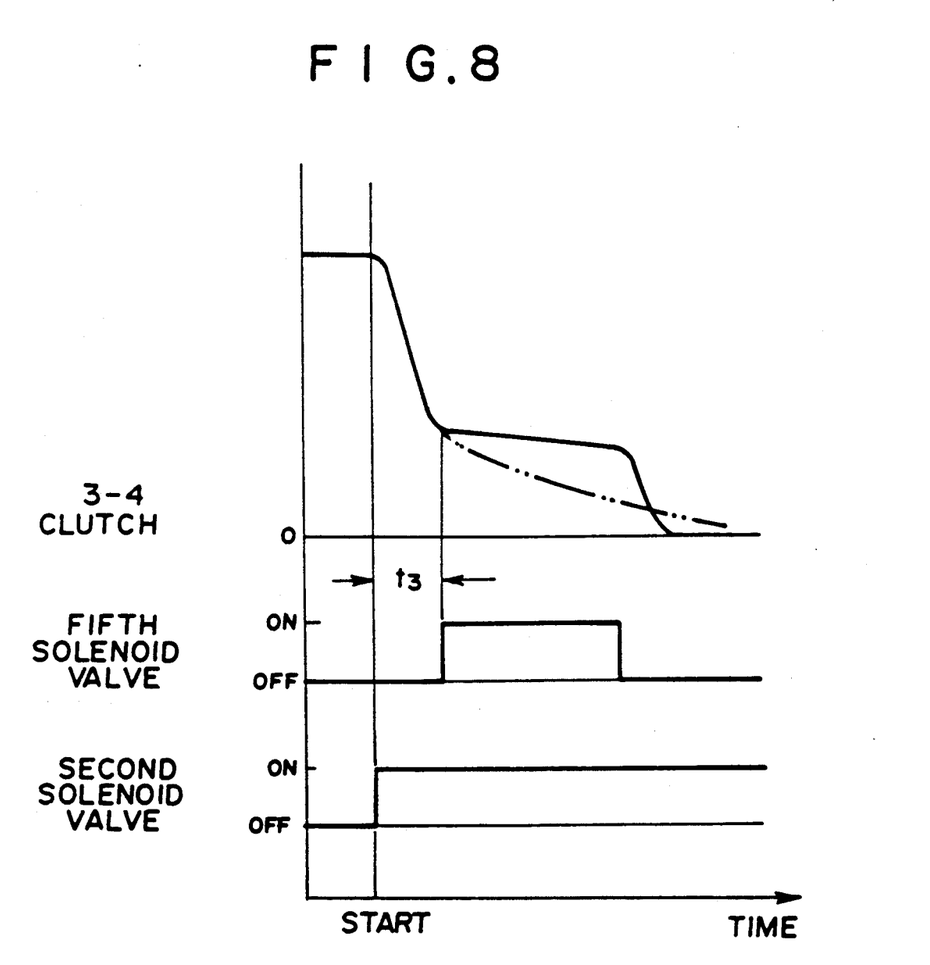
Figure 9:
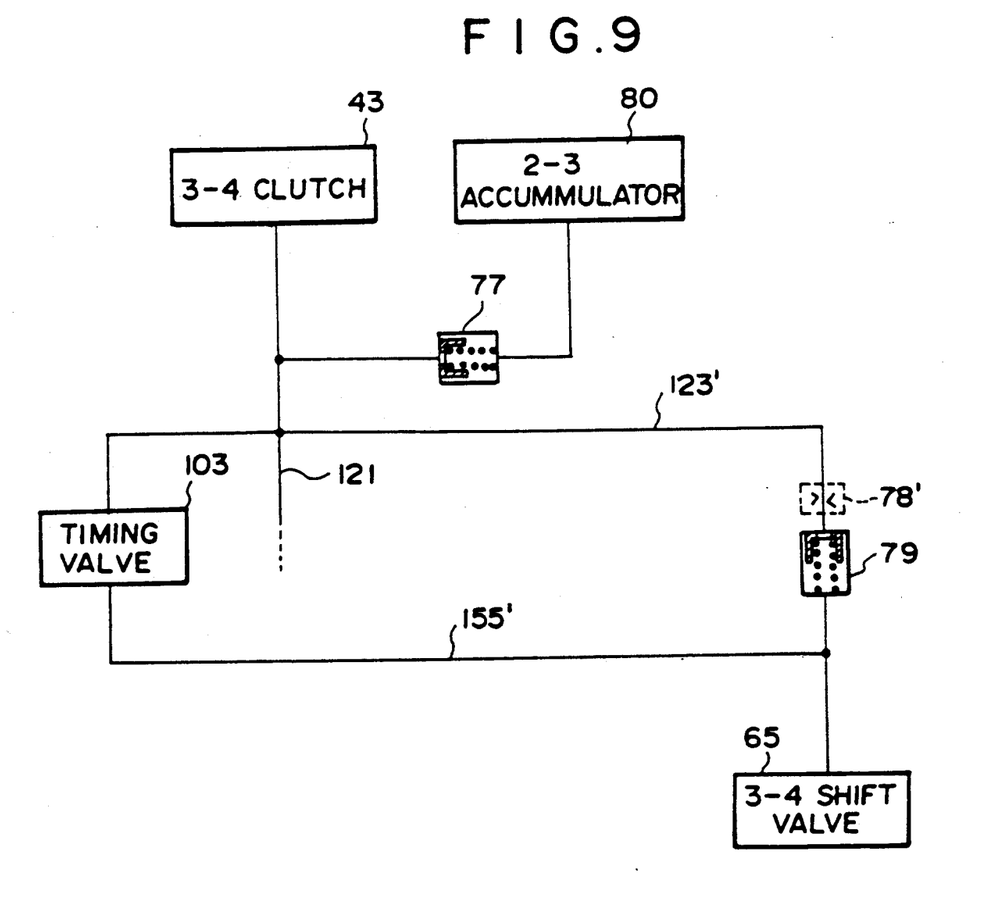
FIG. 9 is a view similar to FIG. 5 but showing a modification of the part shown in FIG. 5.

The 3-4 clutch pressure is discharged during the 4-2 downshift like during the 3-2 downshift. At this time, since the third solenoid valve 68 is kept on and the spool 65a of the 3-4 shift valve 65 is held in the right position, The 3-4 clutch pressure cannot be discharged through the first drain line 122 and is discharged through the drain port 64c of the 2-3 shift valve 64 by way of the second drain line 123, the one-way orifice 77, the fixed orifice 78, the one-way orifice 79, the 3-4 shift valve 65 and the line 124. The fixed orifice 78 exhibits the throttling effect. However, since the fifth solenoid valve 104 is turned on a predetermined time t3 after the start of the 4-2 downshift as shown in FIG. 8, and the spool 103a of the timing valve 103 is moved rightward to close the third bypass line 155. Accordingly, in the former half of this gear-shifting, the 3-4 clutch pressure is quickly discharged through the third bypass line 155. In the latter half of the gear-shifting, the 3-4 clutch pressure is gently lowered since the fixed orifice 78 exhibits the throttling effect and the hydraulic oil is discharged to the second drain line 123 from the 2-3 accummulator 80. During the 4-2 downshift, said one-way clutch 51 which has idled is locked. When the third bypass line 155 is closed immediately before the locking of the one-way clutch 51, the one-way clutch 51 can be locked with the hydraulic pressure stabilized, whereby a smooth gear-shifting can be performed without increasing the time lag.

When the diameter of the fixed orifice 78 is reduced, the similar effect can be obtained without utilizing the hydraulic pressure holding effect of the 2-3 accumulator 80. In this case, the second drain line 123' for the 3-4 clutch pressure is separated from the 2-3 accummulator 80 and a bypass line 155,' which bypasses the fixed orifice 78' (and one-way orifice 79) in the second drain line 123' is provided. Then the timing valve 103 is provided in the bypass line 155'. The change in the 3-4 clutch pressure in this case is as shown by the chained line in FIG. 9.

Since the servo application line 120, the servo release line 126 and the second drain line 123 which are respectively provided with the orifices 73, 82 and 78 engage in the gear-shifting independently from one another, the diameters of the orifices, the operating timing of the timing valve 103 provided across the bypass lines 153, 154 and 155 which bypass the orifices, and the like can be optimally set without interference with others.

We claim:

1. A hydraulic control system for an automatic transmission which has a transmission gear mechanism and a plurality of friction coupling members which are applied or released by hydraulic pressures applied thereto, the control system comprising a hydraulic control circuit which controls the hydraulic pressure fed to or discharged from the respective friction coupling member, thereby changing the condition of application of the friction coupling members and causing the automatic transmission to shift, characterized in that
said plurality of friction coupling members includes first and second friction coupling members the conditions of application of which are changed during gear-shifting from a first predetermined gear speed to a second predetermined gear speed.
the first and second friction coupling members are fed with the hydraulic pressure respectively through first and second hydraulic passages, and
the hydraulic control circuit is provided with a first pressure regulator valve which receives the pressure in the first hydraulic passage as a pilot pressure and regulates the hydraulic pressure to be fed to the second friction coupling member through the second hydraulic passage according to the pilot pressure and a second regulator valve for regulating the pressure of hydraulic fluid discharged to a main line from a fluid pump.

2. A hydraulic control system as defined in claim 1 in which said first and second hydraulic passages are respectively provided with first and second shift valves which controls feed and discharge of the hydraulic pressure to and from the respective hydraulic passages.

3. A hydraulic control system as defined in claim 2 in which said first regulator valve comprises a valve body which is disposed in a third hydraulic passage which connects the second friction coupling member to the second hydraulic passage downstream of the second shift valve, and the valve body regulates the hydraulic pressure in the second hydraulic passage downstream of the second shift valve, thereby regulating the hydraulic pressure applied to the second friction coupling member.

4. A hydraulic control system as defined in claim 3 in which said first regulator valve has a first port which is connected to the part of said third hydraulic passage leading to the second friction coupling member, a second port which is connected to the part of said third hydraulic passage leading to the second shift valve, and a drain port, and said valve body selectively communicates the first port to the second port or the drain port.

5. A hydraulic control system as defined in claim 4 in which said first regulator valve is provided on one end thereof with a pilot port through which the hydraulic pressure in the first hydraulic passage is applied to the first regulator valve.

6. A hydraulic control system as defined in claim 5 in which said first regulator valve is provided on the other end thereof with a feedback port through which the hydraulic pressure in the part of said third hydraulic passage leading to the second friction coupling member is applied to the first regulator valve.

7. A hydraulic control system as defined in claim 3 in which said third hydraulic passage is connected to a fourth hydraulic passage which connects the second friction coupling member to the second hydraulic passage downstream of the second shift valve by way of a one-way orifice so that the third hydraulic passage bypasses the one-way orifice.

8. A hydraulic control system as defined in claim 1 in which said first friction coupling member is a clutch which is released when the transmission is to be in second and is applied when the transmission is to be in third.

9. A hydraulic control system as defined in claim 8 in which said second friction coupling member is a brake which is applied when the transmission is to be in second and is released when the transmission is to be in third.

10. A hydraulic control system as defined in claim 1 in which said first friction coupling member is applied when a predetermined hydraulic pressure is fed to the first hydraulic passage and is released when the pressure in the first hydraulic passage is drained.

11. A hydraulic control system as defined in claim 10 in which said second friction coupling member is released when a predetermined hydraulic pressure is fed to the second hydraulic passage and is applied when the pressure in the second hydraulic passage is drained.

12. A hydraulic control system as defined in claim 1 in which said first and second hydraulic passages are respectively provided with orifices, each of the first and second hydraulic passages is provided with a bypass passage which bypasses the orifice, and a timing valve having a single spool is provided across the bypass passages to open and close the bypass passages.

13. A hydraulic control system for an automatic transmission which has a transmission gear mechanism and a plurality of friction coupling members which are applied or released by hydraulic pressures applied thereto, the control system comprising a hydraulic control circuit which controls the hydraulic pressure fed to or discharged from the respective friction coupling member, thereby changing the condition of application of the friction coupling members and causing the automatic transmission to shift, characterized in that said plurality of friction coupling members includes first to third friction coupling members, the first friction coupling member being applied and the second friction coupling member being released during gear-shifting from a first predetermined gear speed to a second predetermined gear speed and the third friction coupling member being applied in order to obtain the engine brake during the gear-shifting, the first to third friction coupling members are fed with the hydraulic pressure respectively through first to third hydraulic passages, the second hydraulic passage is provided with a first pressure regulator valve which receives the pressure in the first hydraulic passage as a pilot pressure and regulates the hydraulic pressure to be fed to the second friction coupling member through the second hydraulic passage according to the pilot pressure and a second regulator valve for regulating the pressure of hydraulic fluid discharged to a main line from a fluid pump, and the third hydraulic passage branches off from the second hydraulic passage at a portion downstream of the first regulator valve.

14. A hydraulic control system as defined in claim 13 in which said first predetermined gear speed is second and said second predetermined gear speed is third.

* * * * *